(12) United States Patent
Yamada

(10) Patent No.: US 8,576,441 B2
(45) Date of Patent: Nov. 5, 2013

(54) PROFILE CORRECTING METHOD

(75) Inventor: Ryuji Yamada, Ogaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 649 days.

(21) Appl. No.: 12/843,456

(22) Filed: Jul. 26, 2010

(65) Prior Publication Data

US 2011/0058190 A1   Mar. 10, 2011

(30) Foreign Application Priority Data

Sep. 7, 2009   (JP) ................................. 2009-206217

(51) Int. Cl.
H04N 1/60   (2006.01)

(52) U.S. Cl.
USPC ............. 358/1.9; 358/518; 358/520; 345/590

(58) Field of Classification Search
USPC .......... 358/1.9, 518, 520, 523, 524, 162, 167; 345/590; 385/162, 167
See application file for complete search history.

(56) References Cited

U.S. PATENT DOCUMENTS

| | | | |
|---|---|---|---|
| 3,457,362 A | 7/1969 | Mackey et al. | |
| 5,767,991 A * | 6/1998 | Hara | 358/518 |
| 7,936,481 B2 * | 5/2011 | Nakatani et al. | |
| 8,310,723 B2 * | 11/2012 | Nakatani et al. | 358/1.9 |
| 2002/0000993 A1 * | 1/2002 | Deishi et al. | 345/590 |
| 2003/0193677 A1 | 10/2003 | Zeng | |
| 2005/0168495 A1 | 8/2005 | Nakatani et al. | |
| 2005/0213121 A1 * | 9/2005 | Chang | 358/1.9 |
| 2006/0103863 A1 * | 5/2006 | Nobushima | 358/1.9 |
| 2006/0244984 A1 * | 11/2006 | Yoshida et al. | 358/1.9 |
| 2007/0146752 A1 * | 6/2007 | Iguchi | 358/1.9 |
| 2012/0113441 A1 * | 5/2012 | Hama et al. | 358/1.9 |

FOREIGN PATENT DOCUMENTS

| | | |
|---|---|---|
| JP | 2001-016475 | 1/2001 |
| JP | 2002-223362 | 8/2002 |
| JP | 2003-169219 | 6/2003 |
| JP | 2004-88142 | 3/2004 |
| JP | 2004-320190 | 11/2004 |
| JP | 2005-217985 | 8/2005 |
| JP | 2006-345358 | 12/2006 |
| JP | 2007-150757 | 6/2007 |
| JP | 2007-158723 | 6/2007 |
| JP | 2008-312117 | 12/2008 |

OTHER PUBLICATIONS

Extended European Search Report dated Oct. 28, 2010.
Office Action dated Jan. 29, 2013 received from the Japanese Patent Office from related Japanese Application No. 2009-206217, together with an English-language translation.

* cited by examiner

Primary Examiner — Kimberly A Williams
(74) Attorney, Agent, or Firm — Scully, Scott, Murphy & Presser, PC

(57) ABSTRACT

A profile correcting method includes: acquiring a device profile indicating correspondence relationships between a plurality of input values and a plurality of sets of first output values, each first output value set corresponding to one of the plurality of input values, each input value representing an achromatic color having a density level, each first output value set including a plurality of chromatic values each representing a chromatic color, the achromatic color being reproduced by mixing the chromatic color; and, performing a process for each input value.

6 Claims, 9 Drawing Sheets

BLUE HUE RANGE

PROFILE CORRECTING METHOD

CROSS REFERENCE TO RELATED APPLICATION

This application claims priority from Japanese Patent Application No. 2009-206217 filed Sep. 7, 2009. The entire content of the priority application is incorporated herein by reference.

TECHNICAL FIELD

The present invention relates to a profile correcting method, an image forming device using a device profile corrected in the profile correcting method, and a profile correcting device.

BACKGROUND

Some image-forming devices known in the art are provided with colorant (toner, ink, or the like) in a plurality of chromatic colors, such as cyan (C), magenta (M), and yellow (Y), and are capable of rendering gray by combining toner of these chromatic colors. In a printer calibration system disclosed in Japanese unexamined patent application publication No. 2007-150757, for example, a user outputs a gray patch via a server computer (personal computer), measures the color values (tristimulus values) of the patch with a colorimeter, creates calibration data based on these colorimetric values, and transmits the data to a printer. The printer then prints out images using the calibration data. In this way, the printer calibration system can prevent an upset in gray balance that may occur when the quantities of colorants used to form images fluctuate over time.

However, in order to prevent changes in gray colors with this conventional system, the calibration process must be executed frequently, leading to a large waste of colorant and time.

SUMMARY

In view of the foregoing, it is an object of the present invention to provide an image-forming device and a profile correcting method capable of enhancing the stability of gray tones without frequent execution of a calibration process.

In order to attain the above and other objects, the invention provides a profile correcting method including: acquiring a device profile indicating correspondence relationships between a plurality of input values and a plurality of sets of first output values, each first output value set corresponding to one of the plurality of input values, each input value representing an achromatic color having a density level, each first output value set including a plurality of chromatic values each representing a chromatic color, the achromatic color being reproduced by mixing the chromatic color; and, performing a process for each input value. The process includes: forming a test patch based on one first output value set corresponding to the each input value; measuring color of the test patch, the color being represented by a set of a*b* values, the a*b* value set including a first a* value and a first b* value which are defined in a CIEL*a*b* color space; determining whether or not the one first output value set is a to-be-corrected first output value set, the to-be-corrected first output value set corresponding to a test patch whose color is represented by an a* b* value set including at least one of the first a* value greater than an a* prescribed value and the first b* value greater than a b* prescribed value, the a* prescribed value and the b* prescribed value being smaller than zero; and correcting, if the one first output value set is the to-be-corrected first output value set, the one first output value set to a second output value set which is to form color that is represented by an a* b* value set including a second a* value and a second b* value, the second a* value being smaller than or equal to the a* prescribed value, the second b* value being smaller than or equal to the b* prescribed value.

According to another aspect, the present invention provides an image forming device including an image forming unit that is configured to form an image; and a storing unit. The storing unit is configured to store a device profile indicating correspondence relationships between a plurality of input values and a plurality of sets of output values, each output value set corresponding to one of the plurality of input values. Each input value representing an achromatic color has a density level. Each output value set includes a plurality of chromatic values each representing a chromatic color, the achromatic color being reproduced by mixing the chromatic color. Each output value set corresponding to one input value enables the image forming unit to form color that is represented by an a* b* value set. The a*b* value set includes an a* value and a b* value which are defined in a CIEL*a*b* color space. The a* value is smaller than or equal to an a* prescribed value. The b* value is smaller than or equal to a b* prescribed value. The a* prescribed value and the b* prescribed value are smaller than zero.

According to another aspect, the present invention provides a profile correcting device including an acquiring unit and a performing unit. The acquiring unit is configured to acquire a device profile indicating correspondence relationships between a plurality of input values and a plurality of sets of first output values. Each first output value set corresponds to one of the plurality of input values. Each input value represents an achromatic color having a density level. Each first output value set includes a plurality of chromatic values each representing a chromatic color. The achromatic color is reproduced by mixing the chromatic color. The performing unit is configured to perform a process for each input value. The performing unit includes a control unit, a measuring unit, a determining unit, and a correcting unit. The control unit is configured to control an image forming device to form a test patch based on one first output value set corresponding to the each input value. The measuring unit is configured to measure color of the test patch. The color is represented by a set of a*b* values. The a*b* value set includes a first a* value and a first b* value which are defined in a CIEL*a*b* color space. The determining unit is configured to determine whether or not the one first output value set is a to-be-corrected first output value set. The to-be-corrected first output value set corresponds to a test patch whose color is represented by an a*b* value set including at least one of the first a* value greater than an a* prescribed value and the first b* value greater than a b* prescribed value, the a* prescribed value and the b* prescribed value being smaller than zero. The correcting unit is configured to correct, if the determining unit determines that one first output value set is the to-be-corrected first output value set, the one first output value set to a second output value set which enables the image forming device to form color that is represented by an a*b* value set including a second a* value and a second b* value, the second a* value being smaller than or equal to the a* prescribed value, the second b* value being smaller than or equal to the b* prescribed value.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
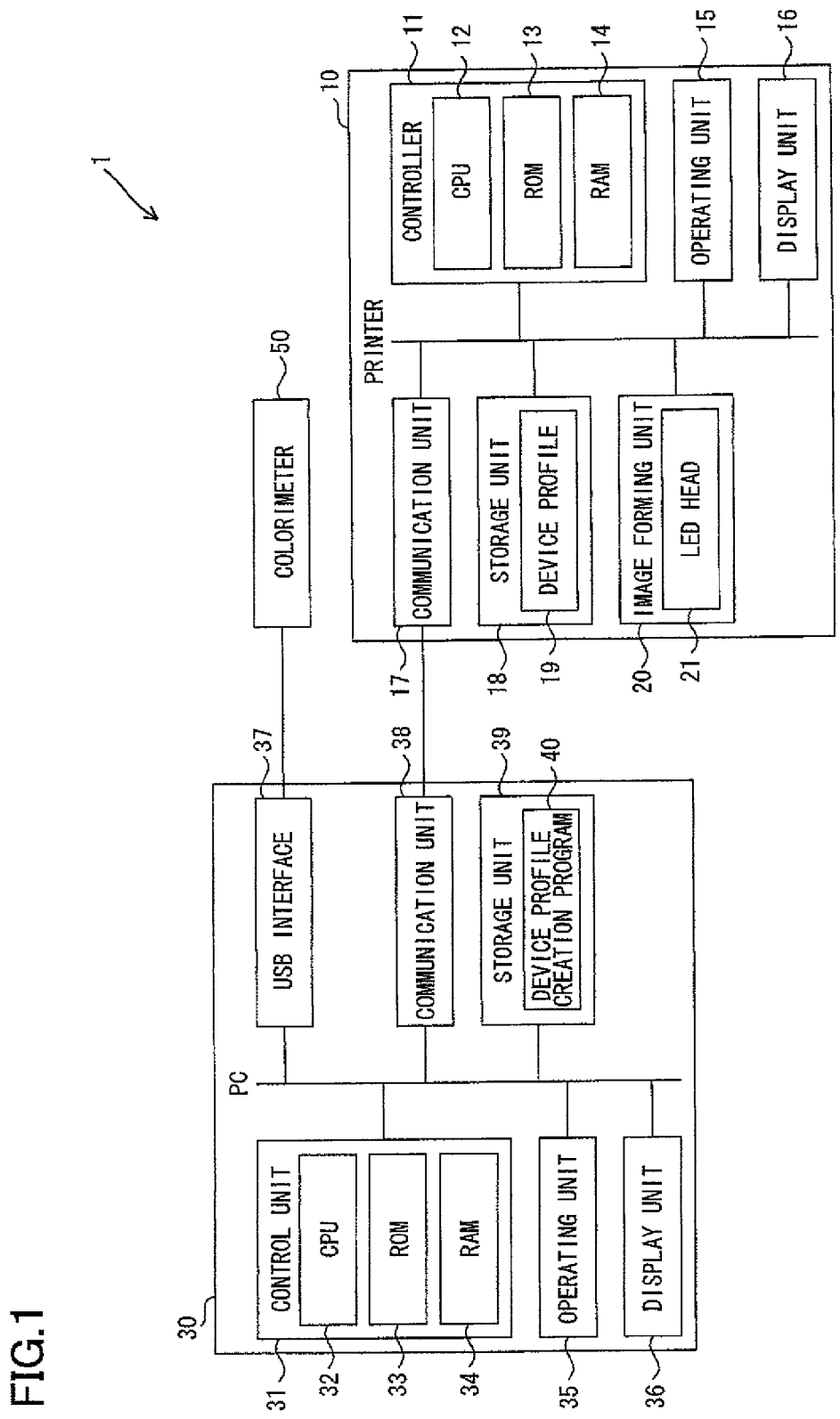
FIG. 1 is a block diagram showing a profile creating system including an image forming device and a profile creating device according to an embodiment of the invention.

As shown in FIG. 1, a profile correcting system 1 according to an embodiment includes a printer 10 and a personal computer (PC) 30. The device profile creating system 1 functions to create a device profile (ICC profile) used for converting input color values (gray levels) received by the printer 10 into output color values (CMYK values) expressed in color values of toner used in the printer 10.

The printer 10 includes a controller 11, an operating unit 15, a display unit 16, a communication unit 17, a storage unit 18, and an image forming unit 20. The controller 11 performs overall control of each component in the printer 10. The controller 11 includes a CPU 12, a ROM 13, and a RAM 14. The operating unit 15 is an input device that allows the user to input instructions through external operations. The operating unit 15 includes various operating buttons.

The display unit 16 is an output device for displaying various data in a visual form that the user can understand. A compact liquid crystal display is used as the display unit 16 in this embodiment. The communication unit 17 is an interface for transmitting and receiving data via a network (LAN). In this embodiment, the communication unit 17 can communicate with the PC 30 via the network.

Figure 2:
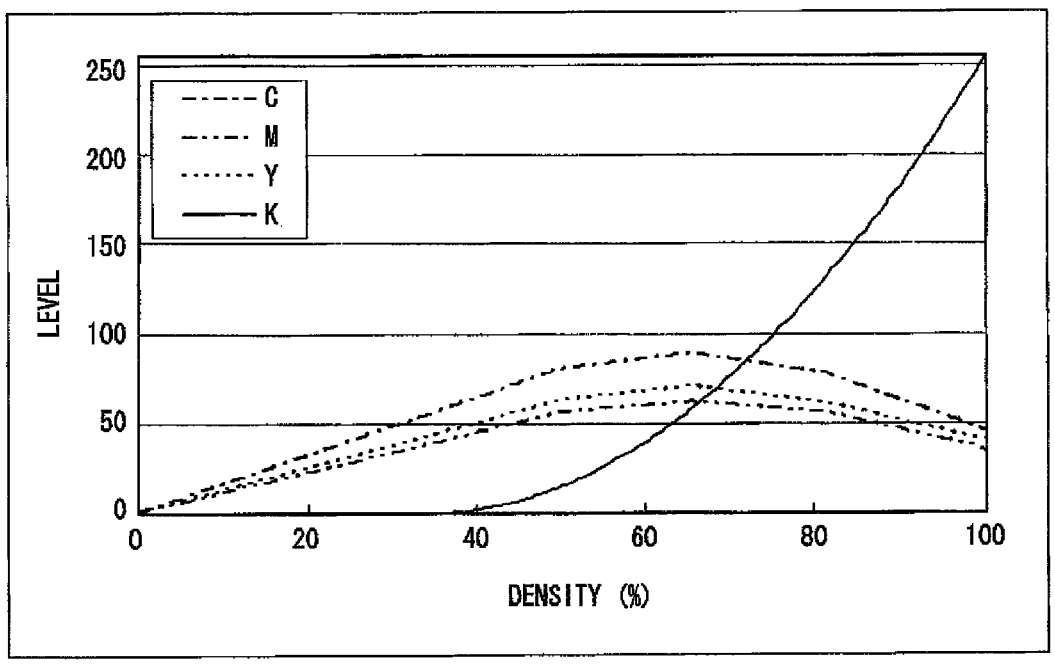
FIG. 2 is a graph showing correspondence relationships between input values (gray levels) and output value sets (CMYK value) contained in a base profile.

The storage unit 18 is a rewritable, nonvolatile storage device. In this embodiment, the storage unit 18 is configured of flash memory. The storage unit 18 stores a device profile 19 created and corrected by using this device profile creating system 1 based on a base profile as shown in FIG. 2. The device profile 19 indicates correspondence relationships between a plurality input values and a plurality of sets of output value.

The image-forming unit 20 is an output device that forms images using toner in the four colors C, M, Y, and K. More specifically, the image-forming unit 20 includes LED heads 21 that function to expose the surfaces of four photosensitive members (not shown) for the respective CMYK colors. Each LED head 21 has an array of LEDs (light sources) arranged along the axial direction of the corresponding photosensitive member.

As the photosensitive members are driven to rotate in the image-forming unit 20, corresponding chargers (not shown) apply a uniform charge to the surfaces of the respective photosensitive members, after which the LED heads 21 expose the surfaces of the respective photosensitive members based on binary image data for each of the CMYK colors to form electrostatic latent images thereon. Next, toner of each color is deposited on the respective electrostatic latent images formed in this way to produce toner images in each of the CMYK colors. These toner images are subsequently superposed to form a color image.

The binary image data for each of the CMYK colors is created as follow. First, a color conversion process is performed to convert color image data inputted from the PC 30 or the like and expressed in RGB values having 256 levels for each value to output image data expressed in CMYK values having 256 levels per value based on the device profile 19 stored in the storage unit 18. Subsequently, this output image data is subjected to a thresholding process to produce binary image data.

The PC 30 is a common data processor that includes a control unit 31, an operating unit 35, a display unit 36, a USB interface 37, a communication unit 38 and a storage unit 39. The control unit 31 performs overall control of each component in the PC 30. The control unit 31 includes a CPU 32, a ROM 33, and a RAM 34. The operating unit 35 is an input device that allows the user to input instructions through external operations. In this embodiment, the operating unit 35 is configured of a keyboard and a pointing device (a mouse, touchpad, or the like).

The display unit 36 is an output device for displaying various data in a visual form that the user can understand. In this embodiment, the display unit 36 is configured of a liquid crystal display. The USB interface 37 performs processes to transmit and receive data via a USB cable. In this embodiment, the USB interface 37 can communicate with a colorimeter 50 via a USB cable.

The colorimeter 50 has functions for measuring color values within the CIEL*a*b* color space (L*a*b* values) and optical density (OD) values of gradation patches (images for measuring colors) printed by the printer 10, and for transmitting these measured values to the PC 30. The color of gray patch is represented by a set of a*b* values. The a*b* value set includes an a* value and a b* value which are defined in a CIEL*a*b* color space. In the CIEL*a*b* color space, L* ($0 \leq L \leq 100$) represents lightness, and a* and b* ($-128 \leq a^*$, $b^* \leq 127$) represent color data. Euclidean distances in the CIEL*a*b* color space are substantially equivalent to how color changes are perceived by humans.

The communication unit 38 is an interface for transmitting and receiving data via a network (LAN). In this embodiment, the communication unit 38 can communicate with the printer 10 via the network.

The storage unit 39 is a rewritable, nonvolatile storage device. In this embodiment, the storage unit 39 is configured of a hard disk drive. The storage unit 39 has various programs installed thereon, including a device profile creation program 40. The device profile creation program 40 is a program for controlling the control unit 31 to create a device profile 19 stored in the printer 10.

A method in which the device profile creation system of this embodiment creates the device profile 19 for the printer 10 will be described next. A common device profile sets toner quantities for the CMYK colors used to render gray tones each having a gray level, as shown in FIG. 2. The device profile indicates correspondence relationships between a plurality of gray tones and a plurality of sets of toner quantities for the CMY colors. Each toner quantity set corresponds to one of the gray tones. Each gray tone represents an achromatic color having a density level. Each toner quantity set includes a plurality of chromatic color (CMY color). The gray tones are reproduced by mixing toner in the CMY colors (CMYK toner colors for high-density grays). Consequently, the gray color rendered by CMY colors will change when the densities of the CMY toners fluctuate due to aging of the printer 10 or the like.

Figure 3A:
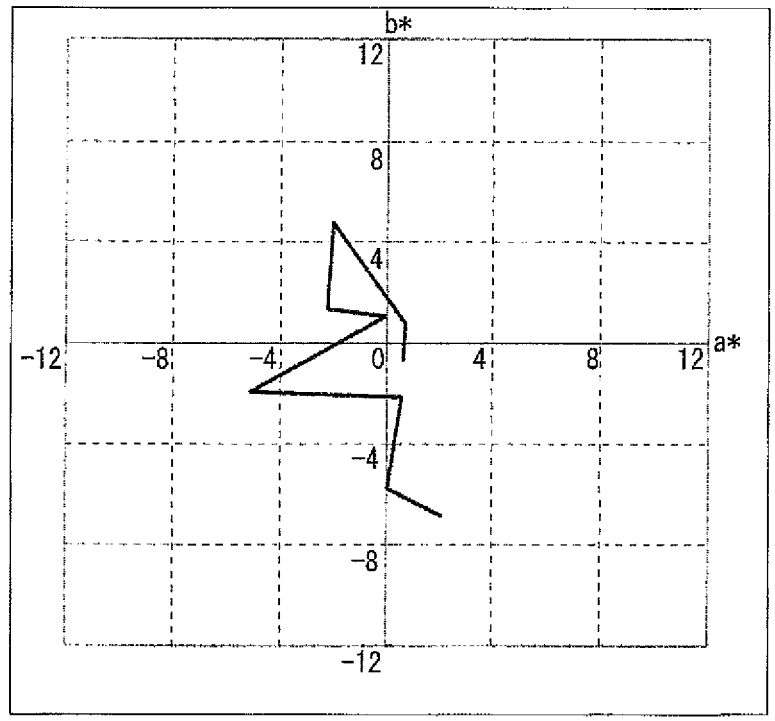
FIG. 3A is a graph showing measured a*b* values that are plotted in an a*b* plane defined in CIEL*a*b* color space, the a*b* values representing colors that are formed by using the base profile.

FIG. 3A shows an area of the a*b* plane in the CIEL*a*b* color space centered on the color value a*=b*=0. In this graph, measured values of gray patches for a plurality of density levels have been plotted and connected by a line in order of increasing density. As shown in FIG. 3A, the color values of images having gray tones are positioned near the color value a*=b*=0 in the a*b* plane (neutral gray). However, when the densities of the CMY toners change, a color difference from the color value a*=b*=0 (colorfulness) increases, making the color in the gray more pronounced. The densities of the CMY toners change due to various factors, for example, temperature, humidity, thickness of recording sheet, dot pattern formed based on dither matrix for density level, and the like. In the example of FIG. 3A, colors having an a* value smaller than 0 and a b* value greater than 0 tend to appear as yellowish or greenish grays; colors having an a* value greater than 0 and b* value smaller than 0 tend to appear as purplish grays; and colors having an a* and b* value smaller than 0 tend to appear as bluish grays.

While fluctuations in the densities of CMY toner can be eliminated by executing a calibration process, the color gradually changes after the calibration process is performed. To avoid such gradual changes, the calibration process must be executed with greater frequency, increasing the amount of wasted toner and time.

Figure 4:
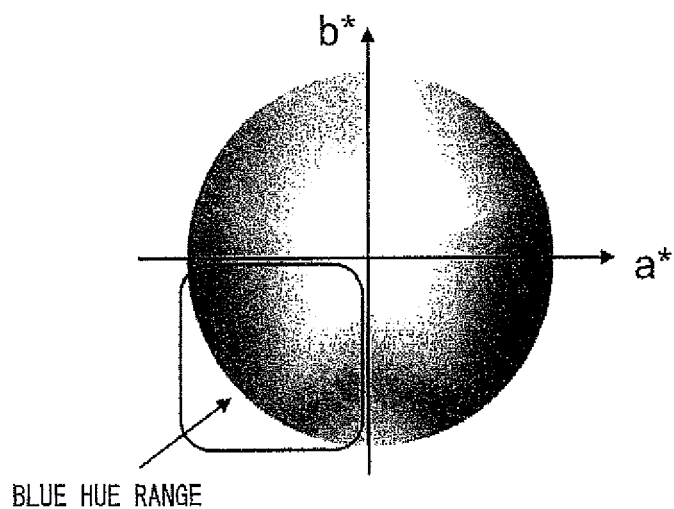
FIG. 4 is a conceptual diagram illustrating a blue hue range in the a*b* plane.

Therefore, the profile creating system 1 according to this embodiment performs a process to correct the device profile in order that gray color values rendered by CMY toner fall within the blue hue range, even when the density fluctuations of CMY toner reach a presumed maximum state. In this specification, the "blue hue range" indicates a region in the a*b* plane in which the a* and b* values are both smaller than or equal to 0, as illustrated in FIG. 4. The maximum state of density fluctuations in CMY toners can be estimated based on the range of allowable density fluctuations stipulated in quality assurance specifications for the printer 10 during the design stage.

The device profile creation process according to this embodiment maintains the gray color values in the blue hue range because shifts in gray toward the blue direction are not as unpleasant to the eye as shifts in gray toward hues other than blue, such as shifts in the yellow direction or the red direction (producing yellowish or reddish grays).

Figure 3B:
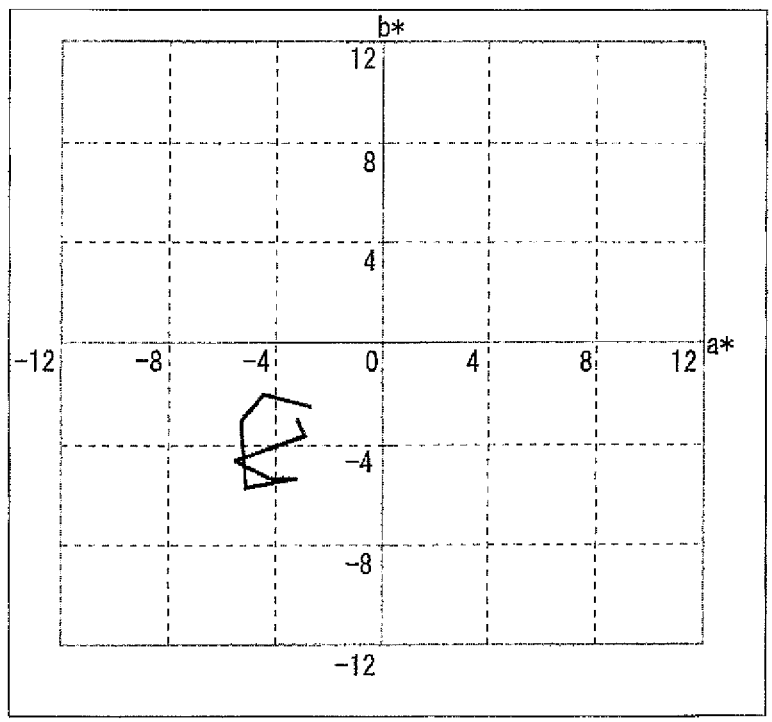
FIG. 3B is a graph showing a*b* values acquired by correcting the measured a*b* values shown in FIG. 3A.

For example, if the estimated maximum values for density changes in CMY toners in both the a* direction (a* margin) and the b* direction (b* margin) are both "2", then the color values for gray tones can be maintained in the blue hue range when the CMY toner densities fluctuate by presetting the color values for gray gradation images so that the a* and b* values both fall within a range of −2 or less, as illustrated in FIG. 3B. Here, the a* margin and b* margin do not need to be the same value, but may differ. Further, the upper limit of the a* and b* values that define the a* and b* margins (−2 for both upper limits in this example) will be called the values of the respective a* and b* margins.

By setting the color values of images for gray tones smaller than or equal to the a* margin and b* margin, as described above, it is possible to maintain gray tones in the blue hue range, even when the densities of CMY toners fluctuate. However, even though shifts in gray in the blue direction are less obvious than shifts in gray in other directions, the color will be perceived as blue rather than gray if the shift in the blue direction is large.

Figure 5:
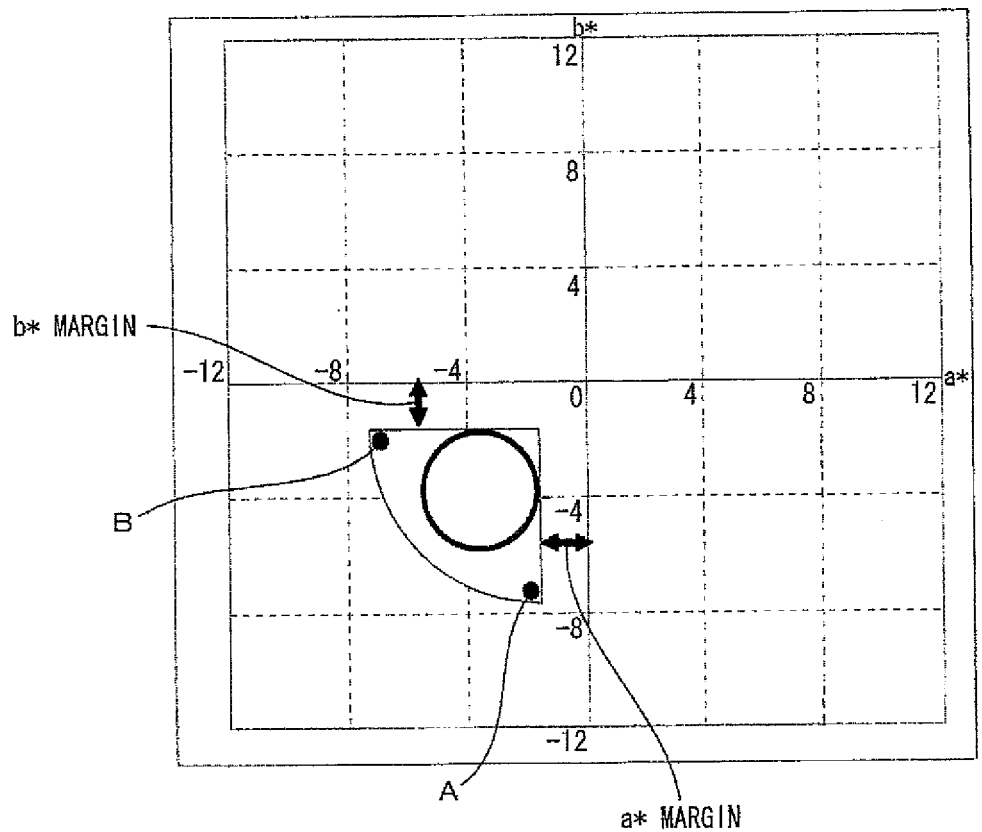
FIG. 5 is a graph showing an area in which all corrected a*b* value fall.

Therefore, the color difference within the blue hue range from the color value a*=b*=0 (neutral gray) is set to be no greater than a gray range upper limit color difference preset as the upper limit of colors perceived as gray by the naked eye. Based on tests that the inventors conducted on a plurality of test subjects, gray tones were perceived as gray rather than blue when the color difference from the a*=b*=0 color values was no greater than 8 for grays shifted into the blue hue range. Hence, the process according to this embodiment corrects the device profile so that color values of images for gray tones fall within a fan-shaped region no greater than the a* margin value and no greater than the b* margin value in which the color difference between the a*=b*=0 color values is smaller than or equal to 8, as shown in FIG. 5.

It is also likely that the image will appear strange to an observer if the color difference in the gray gradations is great, due to the declining quality of gray gradation images, even when the color values (a*b* value) of the gray tones fall within the fan-shaped region. For example, the color difference is great when the color value for a gray density of 10% is point A and the color value for a gray density of 20% is point B in FIG. 5, likely making the image appear unnatural to the observer.

Therefore, the process according to this embodiment calibrates the device profile so that all levels of gray fall within a circular region (see FIG. 5) having a radius equivalent to a concolorous range upper limit color difference ("2" in this embodiment) preset as the upper limit of color differences that cannot be easily perceived by the human eye.

Next, a device profile creation process executed by the control unit 31 of the PC 30 for creating the device profile 19 stored in the printer 10 will be described in detail. It is anticipated that the method for creating the device profile 19 described below will be implemented in the design stage of the printer 10. In other words, the device profile 19 created according to the following process is stored in the storage unit 18 of the printer 10 prior to shipping the printer 10, and the printer 10 performs color conversion processes based on this device profile 19.

Figure 6:
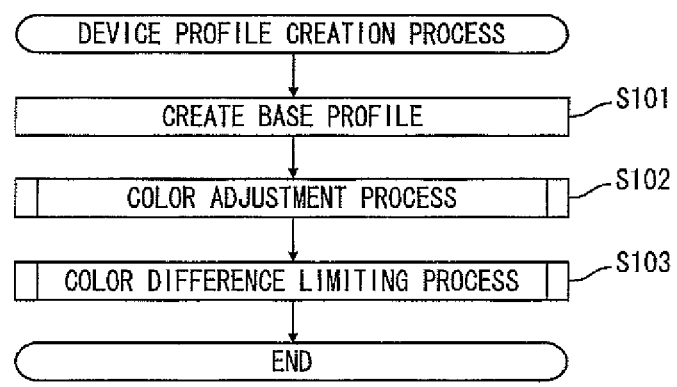
FIG. 6 is a flowchart illustrating steps in a device profile creation process executed by the profile creating device.

FIG. 6 is a flowchart illustrating steps in the device profile creation process that the control unit 31 of the PC 30 (and more specifically the CPU 32) executes based on the device profile creation program 40. The control unit 31 begins the device profile creation process when the user of the PC 30 performs a prescribed start operation.

In S101 at the beginning of the device profile creation process, the control unit 31 creates a base profile shown in FIG. 2 (a normal device profile whose gray color values have not yet been corrected to the blue hue range).

In S102 the control unit 31 executes a color adjustment process for adjusting the gray color values toward the blue direction. The color adjustment process will be described later in greater detail with reference to FIG. 7. In S103 the control unit 31 executes a color difference limiting process for limiting the color differences among gray gradations. The color difference limiting process will be described later in greater detail with reference to FIG. 9. Subsequently, the control unit 31 ends the current device profile creation process.

Figure 7:
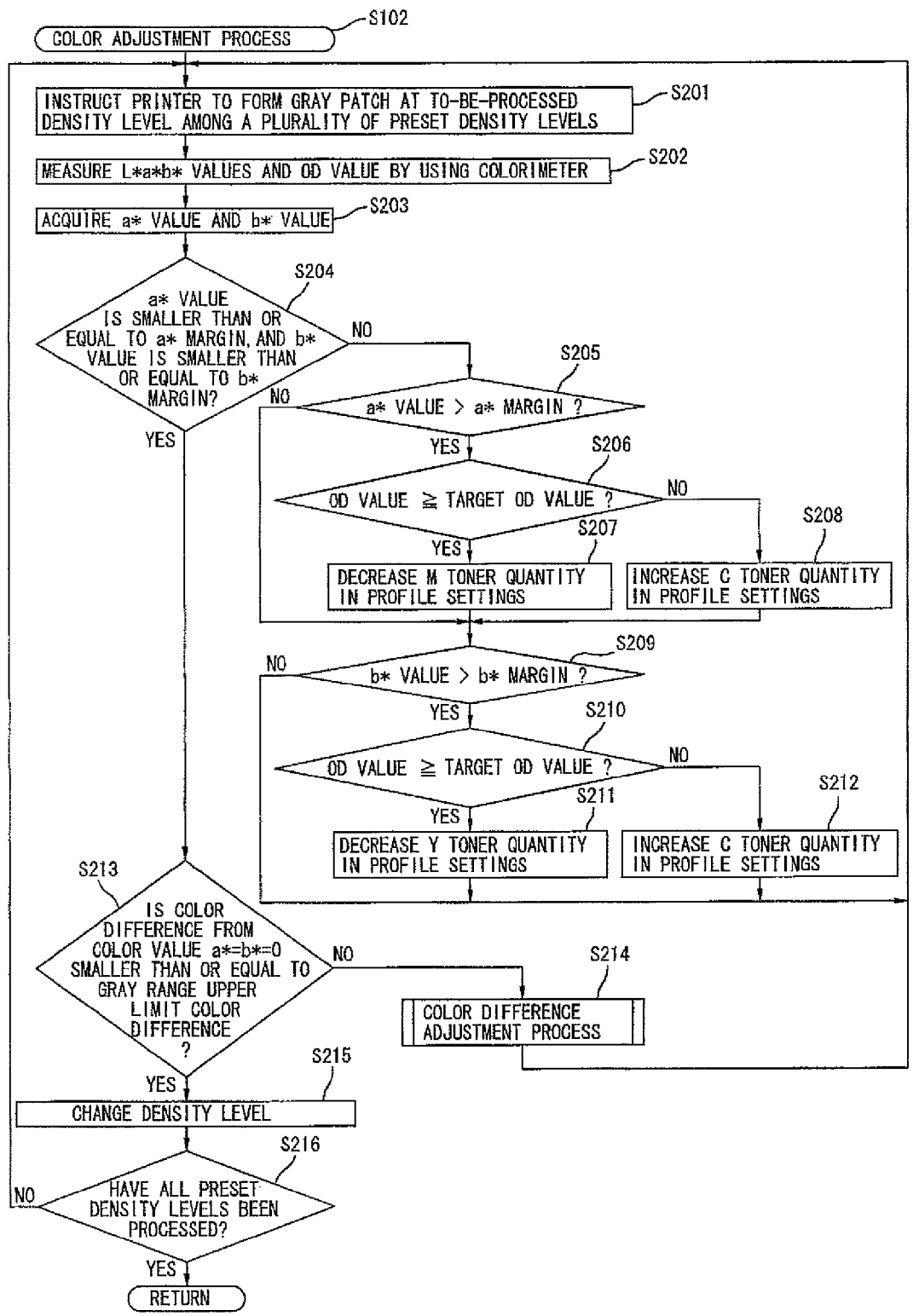
FIG. 7 is a flowchart illustrating steps in a color adjustment process of the device profile creation process.

FIG. 7 is a flowchart illustrating steps in the color adjustment process executed in S102 of the device profile creation process described above with reference to FIG. 6. In S201 at the beginning of the color adjustment process, the control unit 31 instructs the printer 10 to form (print) a gray patch (gray gradation patch) at a to-be-processed density level from among a plurality of preset density levels (density levels at 10% increments, for example). At the time, the control unit 31 transmits the latest device profile to the printer 10. When the printer 10 receives and stores the device profile, the printer 10 forms a gray test patch based on a toner quantity set contained in the received device profile 19 (base profile, at first), the toner quantity set corresponding to the to-be-processed density level. The to-be-processed density level is changed sequentially in S215 described below so that all density levels are sequentially set as the to-be-processed density level. In other words, in the device profile creation process, the control unit 31 repeats S201-S214 for each density level.

In S202 the colorimeter 50 is used to measure the L*a*b* values and the OD value for the gray patch formed in S201 at the to-be-processed density level. In other words, the control unit 31 controls the colorimeter 50 to measure color of the gray patch corresponding to the to-be-processed density level. This process can be implemented by displaying a message on the display unit 36 instructing the user of the PC 30 to measure the color of the gray patch. Upon receiving this message, the user performs operations to measure the gray patch using the colorimeter 50.

In S203 the control unit 31 acquires and checks the a* and b* values measured in S202 and in S204 determines whether the a* value is no greater than the a* margin value and whether the b* value is no greater than the b* margin value. In other words, the control unit 31 determines whether or not the CMY color values set is a to-be-corrected first output value set. The to-be-corrected CMYK value set is CMYK values set corresponding to a test patch whose color is represented by an a*b* value set including at least one of the a* value greater than the a* margin value and the b* value greater than the b* margin value. The image forming unit 20 forms, based on this CMYK value set, color having at least one of the a* value greater than the a* margin value and the b* value greater than the b* margin value.

If the control unit 31 determines in S204 that the a* value is greater than the a* margin value or that the b* value is greater than the b* margin value (S204: No), in other words, if the CMYK values is the to-be-corrected CMYK values, in S205 the control unit 31 begins a process to calibrate the CMYK values (output value set) in the device profile 19 in association with the gray patch corresponding to the present to-be-processed gray tones.

Specifically, in S205 the control unit 31 determines whether or not the a* value is greater than the a* margin value. If the control unit 31 determines that the a* value is greater than the a* margin value (S205: Yes), in S206 the control unit 31 acquires a target (suitable) OD value preset for a gray patch corresponding to the present to-be-processed density level and the OD value measured in S202 corresponding to the to-be-corrected CMYK value set, and determines whether the OD value is greater than or equal to the target OD value. If the control unit 31 determines in S206 that the OD value is greater than or equal to the target OD value (S206: Yes), in S207 the control unit 31 corrects the CMYK values by decreasing the M toner quantity in profile settings contained in the device profile 19 by a predetermined unit quantity, and subsequently advances to S209. However, if the control unit 31 determines in S206 that the OD value is smaller than the target OD value (S206: No), in S208 the control unit 31 corrects the CMYK value by increasing the C toner quantity in the device profile 19 by a predetermined unit quantity, and subsequently advances to S209.

Further, if the control unit 31 determines in S205 that the a* value is smaller than or equal to the a* margin value (S205: No), the control unit 31 skips S206-S208 and advances directly to S209.

In S209 the control unit 31 determines whether the b* value is greater than the b* margin value. If the control unit 31 determines in S209 that the b* value exceeds the b* margin value (S209: Yes), in S210 the control unit 31 determines whether or not the OD value is greater than or equal to the target OD value. If the control unit 31 determines that the OD value is greater than or equal to the target OD value (S210: Yes), in S211 the control unit 31 corrects the CMYK values by decreasing the Y toner quantity in the device profile 19 by a predetermined unit quantity, and subsequently returns to S201. However, if the control unit 31 determines in S210 that the OD value is smaller than the target OD value (S210: No), in S212 the control unit 31 corrects the CMYK values by increasing the C toner quantity in the device profile 19 by a predetermined unit quantity, and subsequently returns to S201.

Further, if the control unit 31 determines in S209 that the b* value does not exceed the b* margin value (S209: No), the control unit 31 skips S210-S212 and returns directly to S201.

In this way, steps S205-S212 serve to correct the device profile 19 so that the quantity of one of the CMY toners is increased or decreased by a predetermined unit quantity. Performing these steps only one time does not necessarily adjust the a* value to a value smaller than or equal to the a* margin value and the b* value to a value smaller than or equal to the b* margin value. In other words, in steps S205-S212, the control unit 31 correct CMYK values included in the base profile to new CMYK values which are to form color that is represented by an a*b* value set including a* value smaller than or equal to the a* margin value and b* value smaller than or equal to the b* margin value. Accordingly, the control unit 31 returns to S201 so that the calibrated gray patch corresponding to the new CMYK values can be reprinted and remeasured to find the color difference.

However, when the control unit 31 determines in S204 that the a* value is smaller than or equal to the a* margin value and the b* value is smaller than or equal to the b* margin value (S204: Yes), in S213 the control unit 31 finds a color difference from a reference color value a*=b*=0 and determines whether or not the color difference is smaller than or equal to the gray range upper limit color difference ("8" in this embodiment). The gray range upper limit color difference has been preset as an upper limit of colors perceived as gray by the human eye.

If the control unit 31 determines in S213 that the color difference from the color value a*=b*=0 is greater than the gray range upper limit color difference (S213: No), in S214 the control unit 31 executes a color difference adjustment process for adjusting this color difference from the color value a*=b*=0 to a value no greater than the gray range upper limit color difference. This color difference adjustment process will be described later in greater detail with reference to FIG. 8.

The color difference adjustment process serves to correct the device profile 19 so that one of the CMY toner quantities is either increased or decreased by a predetermined unit quantity. Hence, performing this process only one time does not necessarily adjust the color difference from the color value a*=b*=0 to a value no greater than the gray range upper limit color difference. Accordingly, the control unit 31 returns to S201 and prints and measures new gray patch based on the calibrated CMYK values in order to find the color difference again.

On the other hand, if the control unit 31 determines in S213 that the color difference from the color value a*=b*=0 is smaller than or equal to the gray range upper limit color difference (S213: Yes), in S215 the control unit 31 changes the target density level. In S216 the control unit 31 determines whether or not the above process has been performed on all preset density levels. The control unit 31 returns to S201 when there remain density levels to be processed, and the control unit 31 ends the current color adjustment process when all density levels have been processed.

Figure 8:
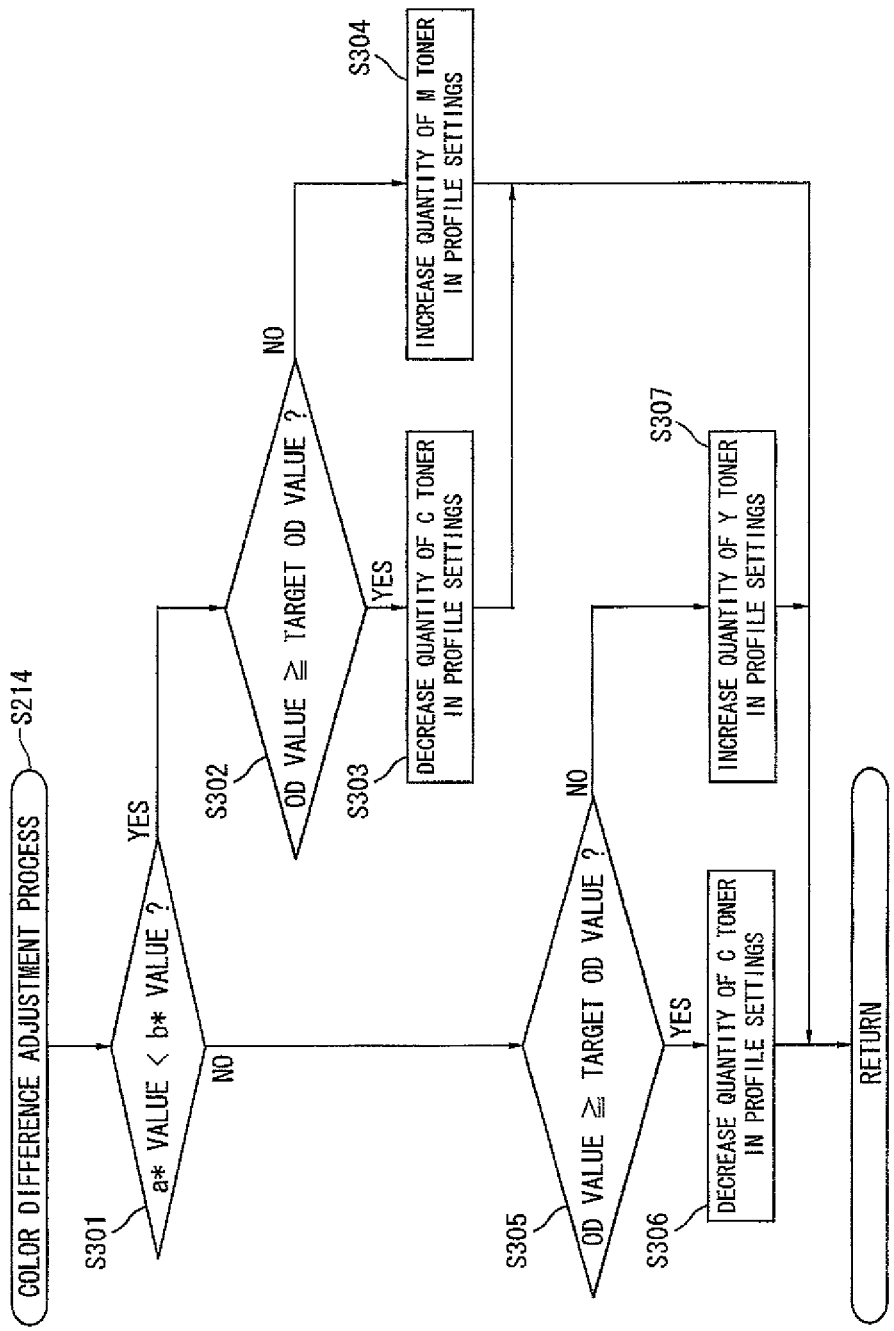
FIG. 8 is a flowchart illustrating steps in a color difference adjustment process of the color adjustment process.

In S301 at the beginning of a color difference adjustment process shown in FIG. 8, the control unit 31 determines whether or not the a* value is smaller than the b* value. In other words, the control unit 31 determines whether or not the a* value is shifted farther away from the a*=b*=0 value.

If the control unit 31 determines in S301 that the a* value is smaller than the b* value (S301: Yes), in S302 the control unit 31 determines whether or not the OD value is greater than or equal to the target OD value. If the control unit 31 determines in S302 that the OD value is greater than or equal to the target OD value (S302: Yes), in S303 the control unit 31 reduces the quantity of C toner in the corrected base profile by the predetermined unit quantity, and subsequently ends the current color difference adjustment process. However, if the control unit 31 determines in S302 that the OD value is smaller than the target OD value (S302: No), in S304 the control unit 31 increases the quantity of M toner in the corrected base profile by the predetermined unit quantity, and subsequently ends the current color difference adjustment process.

Further, if the control unit 31 determines in S301 that the a* value is not less than the b* value, in S305 the control unit 31 determines whether the OD value is greater than or equal to the target OD value. If the control unit 31 determines in S305 that the OD value is greater than or equal to the target OD value (S305: Yes), in S306 the control unit 31 decreases the quantity of C toner in the device profile 19 by the predetermined unit quantity, and subsequently ends the current color difference adjustment process. However, if the control unit 31 determines in S305 that the OD value is less than the target OD value (S305: No), in S307 the control unit 31 increases the quantity of Y toner in the device profile 19 by the predetermined unit quantity, and subsequently ends the current color difference adjustment process.

Figure 9:
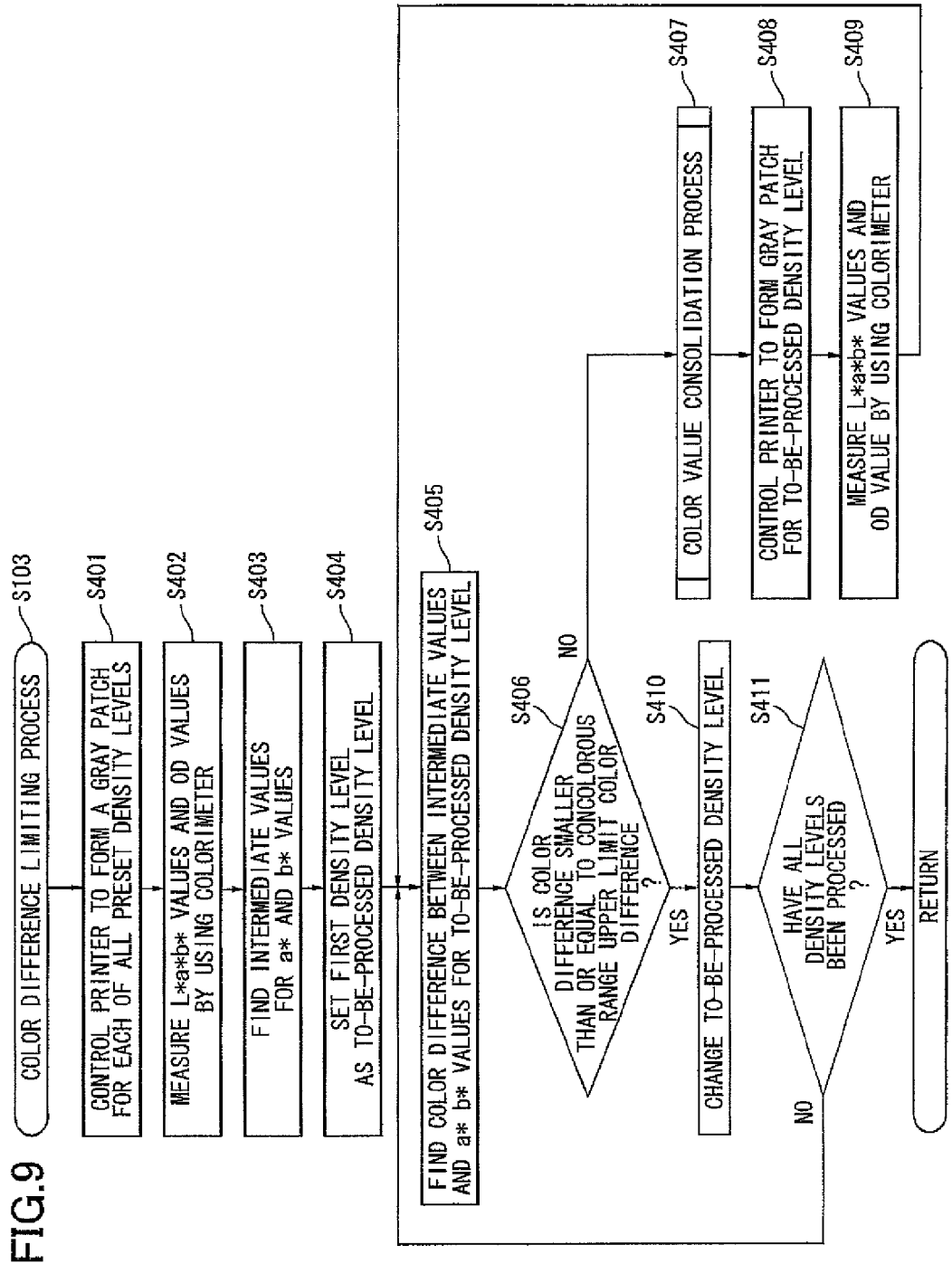
FIG. 9 is a flowchart illustrating steps in a color difference limiting process of the device profile creation process.

In S401 at the beginning of the color difference limiting process shown in FIG. 9, the control unit 31 instructs the printer 10 to print a gray patch for each of the preset density levels. In other words, in S401 the control unit 31 controls the printer 10 to form a gray patch for each of all preset density levels (gray tones). The printer 10 forms gray patches on a recording medium based on the device profile 19 corrected in S102.

In S402 the control unit 31 directs the user of the PC 30 to measure the L*a*b* values and the OD value for each of the plurality of gray patches formed in S401 using the colorimeter 50. This process is implemented according to the same method described in S202.

In S403 the control unit 31 finds an intermediate value in the a*b* plane for color values measured in S402 for all of the gray patches. In other words, the control unit 31 finds the intermediate value of the a* and b* values measured in S402. In S403 the control unit 31 may find a mean value of the a* and b* values for all gray patches instead of the intermediate value. In S404 the control unit 31 sets the first density level (e.g., the lowest of the plurality of density levels) as the to-be-processed density level (the density to be targeted in the subsequent process). The control unit 31 changes this to-be-processed density level sequentially in S410 described later so that each of the plurality of density levels is set sequentially as the to-be-processed density level. In other words, steps S405-S409 described next are executed for each density level.

In S405 the control unit 31 finds a color difference in the a*b* plane between the color value of the to-be-processed density level and the intermediate value found in S403. In other words, the control unit 31 finds the color difference between the intermediate values and the a* and b* values for the to-be-processed density level.

In S406 the control unit 31 determines whether or not the color difference found in S405 is smaller than or equal to than a concolorous range upper limit color difference ("2" in this embodiment) that has been preset as the upper limit of color differences that the human eye has difficulty distinguishing.

If the control unit 31 determines in S406 that the color difference found in S405 is greater than the concolorous range upper limit color difference (S406: No), in S407 the control unit 31 executes a color value consolidation process for adjusting the color difference from the intermediate value to a value smaller than or equal to the concolorous range upper limit color difference. In other words, the control unit 31 in S407 corrects the CMYK value corrected in S102 to new CMYK value which is to form color that is presented by an a*b* value set having a color difference smaller than or equal to the concolorous range upper limit color difference.

The color value consolidation process will be described later in greater detail with reference to FIG. 10. This color value consolidation process serves to calibrate the device profile 19 by increasing or decreasing one of the CMY toner quantities by the preset unit quantity. Performing this process only one time will not necessarily adjust the color difference from the intermediate value to a color difference no greater than the concolorous range upper limit color difference. Accordingly, the control unit 31 again prints and measures the calibrated gray patch to find the color difference (S408, S409, and S405).

Specifically, in S408 the control unit 31 directs the printer 10 to print a gray patch at the to-be-processed density level based on the device profile 19 calibrated in S407. In S409 the control unit 31 prompts the user of the PC 30 to measure the L*a*b* values and the OD value for the gray patch formed in S407 using the colorimeter 50. Subsequently, the control unit 31 returns to S405 and again finds the color difference of this gray patch from the intermediate value.

However, if the control unit 31 determines in S406 that the color difference found in S405 is smaller than or equal to the concolorous range upper limit color difference (S406: Yes), in S410 the control unit 31 changes the to-be-processed density level. In S411 the control unit 31 determines whether or not the above process has been performed for all of the preset density levels. The control unit 31 returns to S405 upon determining that there remain density levels to process (S411: No), and ends the current color difference limiting process upon determining that all density levels have been processed (S411: Yes).

Figure 10:
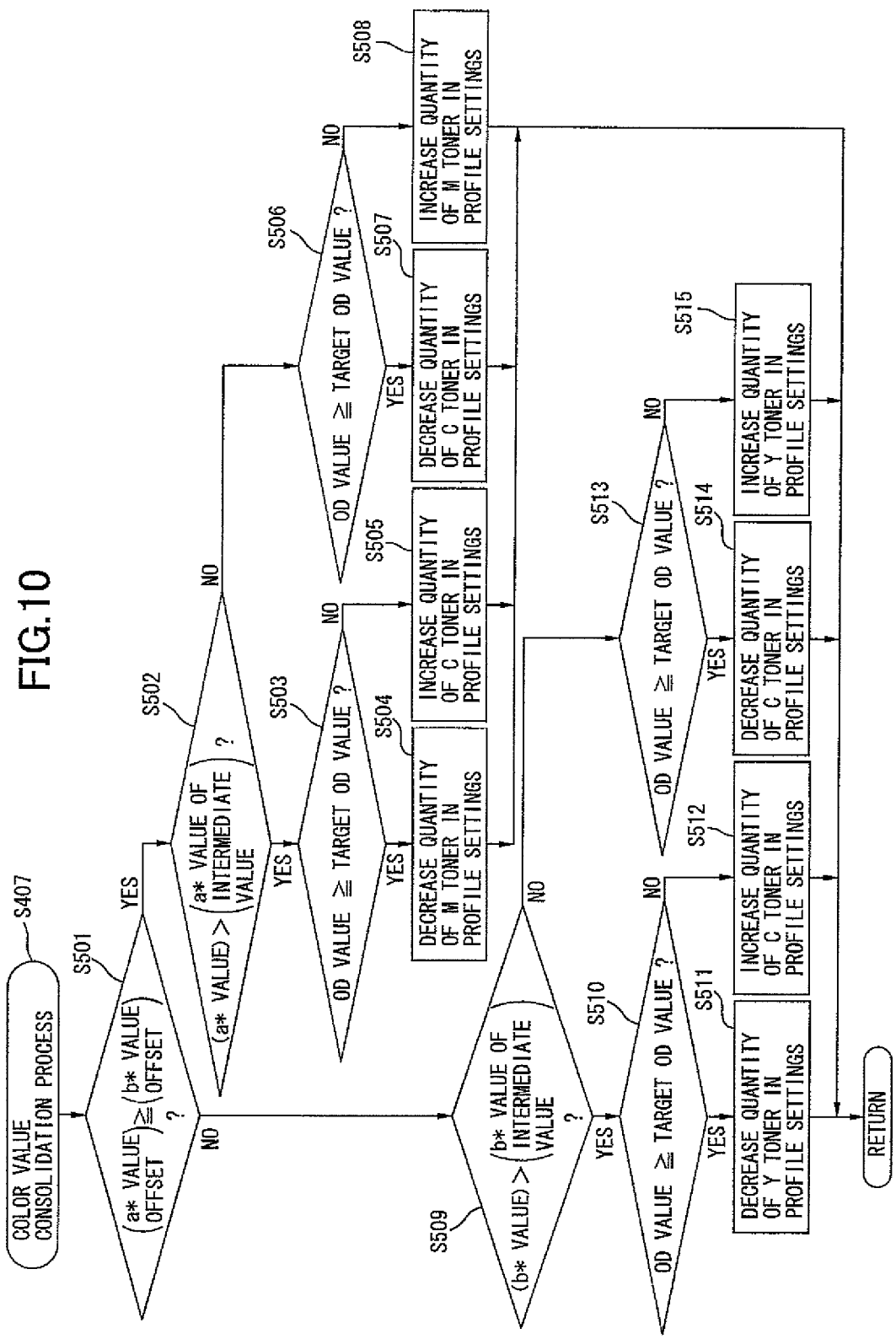
FIG. 10 is a flowchart illustrating steps in a color value consolidation process of the color difference limiting process.

In S501 at the beginning of the color value consolidation process shown in FIG. 10, the control unit 31 determines whether the a* value offset between the color value of the to-be-processed density level and the intermediate value found in S403 is greater than or equal to the corresponding b* value offset. In other words, the control unit 31 determines whether priority should be given to the a* value or the b* value when making adjustments.

If the control unit 31 determines in S501 that the a* value offset is greater than or equal to the b* value offset (i.e., that the a* value should be given priority in adjustments) (S501: Yes), in S502 the control unit 31 determines whether or not the a* value of the gray patch at the to-be-processed density level is greater than the a* value of the intermediate value. That is, the control unit 31 determines whether the a* value should be decreased or increased when making adjustments.

If the control unit 31 determines in S502 that the a* value of the to-be-processed density level is greater than the a* value of the intermediate value (i.e., that the a* value should be decreased) (S502: Yes), in S503 the control unit 31 determines whether or not the OD value is greater than or equal to the target OD value. If the control unit 31 determines in S503 that the OD value is greater than or equal to the target OD value (S503: Yes), in S504 the control unit 31 decreases the M toner quantity in the device profile 19 by the predetermined unit quantity, and subsequent ends the current color value consolidation process. However, if the control unit 31 determines in S503 that the OD value is smaller than the target OD value (S503: No), in S505 the control unit 31 increases the C toner quantity in the device profile 19 by the predetermined unit quantity.

Further, if the control unit 31 determines in S502 that the a* value corresponding to the to-be-processed density level is not greater than the a* value of the intermediate value (i.e., that the a* value should be increased) (S502: No), in S506 the control unit 31 determines whether or not the OD value is greater than or equal to the target OD value. If the control unit 31 determines in S506 that the OD value is greater than or equal to the target OD value (S506: Yes), in S507 the control unit 31 decreases the C toner quantity in the device profile 19 by the predetermined unit quantity, and subsequently ends the current color value consolidation process. However, if the control unit 31 determines in S506 that the OD value is less than the target OD value (S506: No), in S508 the control unit 31 increases the M toner quantity in the device profile 19 by the predetermined unit quantity, and subsequently ends the current color value consolidation process.

On the other hand, if the control unit 31 determines in S501 that the a* value offset is less than the b* value offset (i.e., that the b* value should be given priority in adjustments) (S501: No), in S509 the control unit 31 determines whether or not the b* value corresponding to the to-be-processed density level is greater than the b* value of the intermediate value. In other words, the control unit 31 determines whether or not the b* value should be decreased or increased when making adjustments.

If the control unit 31 determines in S509 that the b* value corresponding to the to-be-processed density level is greater than the b* value of the intermediate value (i.e., that the b* value should be decreased) (S509: Yes), in S510 the control unit 31 determines whether or not the OD value is greater than or equal to the target OD value. If the control unit 31 determines in S510 that the OD value is greater than or equal to the target OD value (S510: Yes), in S511 the control unit 31 decreases the Y toner quantity in the device profile 19 by the predetermined unit quantity, and subsequently ends the current color value consolidation process. However, if the control unit 31 determines in S510 that the OD value is less than the target OD value (S510: No), in S512 the control unit 31 increases the C toner quantity in the device profile 19 by the predetermined unit quantity, and subsequently ends the current color value consolidation process.

Further, if the control unit 31 determines in S509 that the b* value for the to-be-processed density level is not greater than the b* value of the intermediate value (i.e., that the b* value should be increased) (S509: No), in S513 the control unit 31 determines whether or not the OD value is greater than or equal to the target OD value. If the control unit 31 determines in S513 that the OD value is greater than or equal to the target OD value (S513: Yes), in S514 the control unit 31 decreases the C toner quantity in the device profile 19 by the predetermined unit quantity, and subsequently ends the current color value consolidation process. However, if the control unit 31 determines in S513 that the OD value is less than the target value (S513: No), in S515 the control unit 31 increases the Y toner quantity in the device profile 19 by the predetermined unit quantity, and subsequently ends the current color value consolidation process. Therefore, the control unit 31 creates the device profile 19 by correcting the base profile, and transmitting the device profile 19 to the printer 10.

In the device profile creating system 1 according to the embodiment described above, the printer 10 is instructed to form gray patches based on input color values rendering gray at a plurality of density levels, and the user of the PC 30 is instructed to measure the colors of each gray patch (S201, S202). If the measured a* value exceeds the a* margin value or if the measured b* value exceeds the b* margin value (S204: NO), the PC 30 calibrates the output color values set (CMYK values) in the device profile 19 that are associated with these input color values (gray levels) so that the measured a* value of the gray patch formed based on input color values is no greater than the a* margin value and the measured b* value of the gray patch is smaller than or equal to the b* margin value (S205-S212).

Therefore, the printer 10 can produce gray tones with enhanced stability using the device profile 19 corrected according to this device profile correcting method, without necessitating frequent execution of the calibration process.

In other words, the a* margin value and b* margin value are set so that both the a* and b* values of a gray image do not exceed 0, even when the densities of the CMY toners fluctuate due to aging of the printer 10 or the like. Accordingly, gray tones are maintained in the blue hue range, even when the quantities of CMY toners fluctuate, improving the stability of these gray tones without requiring frequent execution of the calibration process. In this way, printed images are less likely to appear unnatural to the observer since grays shifted in the blue direction are less noticeable than grays shifted in a different direction, such as the red or yellow direction.

In this device profile correcting method, output color values (CMYK values) are set to correspond with input color values (gray levels) so that the color difference between color values of an image formed based on input color values expressing gray and the color value $a^*=b^*=0$ within the a*b* plane (neutral gray) are no greater than a gray range upper limit color value. The gray range upper limit color value can be set to a rough upper limit value for colors perceived as gray with the naked eye. By setting the upper limit in this way, even gray colors shifted in the blue direction are perceived as gray by the naked eye.

If a color difference in the a*b* plane between the measured values of a gray patch formed based on input color values representing gray and the color value $a^*=b^*=0$ exceed the gray range upper limit color difference set as the upper limit of colors perceived as gray by the human eye (S213: NO), in this correcting method the PC 30 calibrates the output color values (CMYK values) in the device profile 19 associated with these input color values (gray levels) so that the color difference of the gray patch formed based on these input color values is no greater than the gray range upper limit color difference.

Accordingly, the printer 10 using the device profile 19 corrected according to this device profile correcting method can be prevented from shifting the color tones of an image based on input color values representing gray too far in the blue direction, which can shift the gray tones outside of the range perceived as gray by the human eye.

Further, in this calibration method, the PC 30 finds an intermediate value of measured color values for a gray patch formed based on input color values representing gray at a plurality of density levels (S401-S403). If there exist measured values whose color difference from this intermediate value exceeds the concolorous range upper limit color difference set as the upper limit of color differences that the human eye has difficulty perceiving (S406: NO), the PC 30 calibrates the output color values in the device profile associated with these input color values so that the color difference of the gray patch based on these input color values is smaller than or equal to the concolorous range upper limit color difference (S407).

Further, the output colors (CMYK values) are set to correspond with input color values so that the color values of an image formed based on the input color values expressing gray in a plurality of density levels fall within a circular region in the a*b* plane whose radius is a concolorous range upper limit color difference. This concolorous range upper limit color difference may be set to a color difference that is difficult to distinguish with the naked eye. By setting the color difference in this way, even grays that, strictly speaking, have different color shifts depending on the density level can be perceived as the same color of gray by the naked eye.

Hence, by calibrating the device profile 19 for use on the printer 10 according to the above calibration method, it is possible to prevent a worsening of image quality in gray gradations formed by the printer 10 caused by large variations in color shifts among different gray densities.

Methods for calibrating output color values in order to change the positions of calorimetric values in images used for measuring colors in a desired direction within the a*b* plane include a method for increasing the quantity of colorant for a certain color and a method for decreasing the quantity of color for another color. However, it is preferable to select a method that produces color densities closest to the target (suitable) densities in the images used for measuring colors when such target densities have been set.

On the other hand, when the OD value of the gray patch is greater than or equal to a target OD value preset for this gray patch, the PC 30 corrects the output color values (CMYK values) in a direction for decreasing the quantity of toner used to form the gray patch. If the OD value is smaller than the target OD value, the PC 30 corrects the output color values in a direction for increasing the quantity of toner used to form the gray patch. Accordingly, this correcting method can reduce the degree of tone shift related to the to-be-processed density level of the image when correcting the output color values.

The printer 10 according to the above-described embodiment uses LED heads 21 as exposure devices. Unlike devices that use lasers for exposure, irregularities among the plurality of LEDs (within the LED array; such as irregularities in the intensity of exposure light, the focal positions, and the like) produce irregularities in hue. However, the calibration method according to the above-described embodiment can reduce variations in gray hues caused by irregularities in the LED array.

While the invention has been described in detail with reference to the embodiment thereof, it would be apparent to those skilled in the art that various changes and modifications may be made therein without departing from the spirit of the invention.

For example, while the image-forming device of the present invention described in the above-described embodiment is a color printer for forming images using toner in the CMYK colors, the present invention is not limited to this device. Specifically, the colorant used to form the images is not limited to toner, but may be ink or the like. Further, the plurality of chromatic colors that are combined to render grays is not limited to the CMY colors, but may include light cyan, light magenta, and light yellow, for example. Further, the exposure means employed in the image-forming device is not limited to an LED system, but may be a laser system, for example.

Further, in the above-described embodiment, the control unit 31 repeats the process of S201-S214 until the gray patch for the to-be-processed density level is represented by suitable a* and b* values. In other words, the control emit 31 forms and measures, for one to-be-processed density level, a plurality of gray patches as necessary. However, for one to-be-processed density level, the control unit 31 may form and measure the gray patch one time and may calculate corrected output value set (CMYK values) based on the only one measured L*a*b* values and OD density.

Further, in the above-described embodiment, the control unit 31 performs the determination step in S213 and the color difference adjustment process in S214. However, these processes may be deleted from the color adjustment process shown in FIG. 7.

What is claimed is:

1. A profile correcting method comprising:
acquiring a device profile indicating correspondence relationships between a plurality of input values and a plurality of sets of first output values, each first output value set corresponding to one of the plurality of input values, each input value representing an achromatic color having a density level, each first output value set including a plurality of chromatic values each representing a chromatic color, the achromatic color being reproduced by mixing the chromatic color; and
performing a process for each input value, the process comprising:
forming a test patch based on one first output value set corresponding to the each input value;
measuring color of the test patch, the color being represented by a set of a*b* values, the a*b* value set including a first a* value and a first b* value which are defined in a CIEL*a*b* color space;
determining whether or not the one first output value set is a to-be-corrected first output value set, the to-be-corrected first output value set corresponding to a test patch whose color is represented by an a* b* value set including at least one of the first a* value greater than an a* prescribed value and the first b* value greater than a b* prescribed value, the a* prescribed value and the b* prescribed value being smaller than zero; and
correcting, if the one first output value set is the to-be-corrected first output value set, the one first output value set to a second output value set which is to form color that is represented by an a* b* value set including a second a* value and a second b* value, the second a* value being smaller than or equal to the a* prescribed value, the second b* value being smaller than or equal to the b* prescribed value.

2. The profile correcting method according to claim 1, wherein the process comprises:
setting, if the one first output value set is not the to-be-corrected first output value set, the one first output value set as the second output value set, the second a* value and the second b* value being equal to the first a* value and the first b* value, respectively;
finding, for one second output value set corresponding to the each input value, a reference-value-based color difference in an a*b* plane defined in the CIEL*a*b* color space between the a*b* value set corresponding to the one second output value set and a reference value set, the reference value set including an a* reference value and a b* reference value;
determining whether or not the reference-value-based color difference is greater than a reference-value-based prescribed value; and
correcting, if the reference-value-based color difference is greater than the reference-value-based prescribed value, the one second output value set to a reference-value-based-corrected second output value set which is to form color that is represented by an a* b* value set having a color difference, that is smaller than or equal to the first prescribed value, from the reference value set.

3. The profile correcting method according to claim 2, wherein the profile correcting method further comprising:
finding a set of intermediate values for all reference-value-based-corrected second output value sets, the intermediate value set including an a* intermediate value of the second a* values and a b* intermediate value of the second b* values;
finding, for one reference-value-based-corrected second output value set corresponding to each input value, an intermediate-value-based color difference between the intermediate value set and the a*b* value set corresponding to the one reference-value-based-corrected second output value set;
determining whether or not the intermediate-value-based color difference is greater than an intermediate-value-based prescribed value; and
correcting, if the intermediate-value-based color difference is greater than the intermediate-value-based prescribed value, the one reference-value-based output value set to an intermediate output value set which is to form color that is represented by an a* b* value set having a color difference, that is smaller than or equal to the intermediate-value-based prescribed value, from the intermediate value set.

4. The profile correcting method according to claim 1, wherein the process comprises setting, if the one first output value set is not the to-be-corrected first output value set, the one first output value set as the second output value set, the second a* value and the second b* value being equal to the first a* value and the first b* value, respectively;
wherein the profile correcting method further comprising:
finding a set of intermediate values for all second output value sets, the intermediate value set including an a* intermediate value of the second a* values and a b* intermediate value of the second b* values;
finding, for one second output value set corresponding to each input value, an intermediate-value-based color difference between the intermediate value set and the a*b* value set corresponding to the one second output value set;

determining whether or not the intermediate-value-based color difference is greater than a intermediate-value-based prescribed value; and
correcting, if the intermediate-value-based color difference is greater than the intermediate-value-based prescribed value, the one second output value set to a intermediate-value-based-corrected second output value set which is to form color that is represented by an a* b* value set having a color difference, that is smaller than or equal to the intermediate-value-based-corrected prescribed value, from the intermediate value set.

5. The profile correcting method according to claim 1, wherein the correcting comprises:
acquiring a measured density of the test patch corresponding to the one first output value set that is determined as the to-be-corrected first output value set,
acquiring a target density for the each input value;
determining whether or not the measured density is greater than or equal to the target density;
correcting, if the measured density is greater than or equal to the target density, the one first output value set to the second output value set by decreasing at least one of the chromatic values included in the one first output value set; and
correcting, if the measured density is smaller than the target density, the one first output value set to the second output value set by increasing at least one of the chromatic values included in the one first output value set.

6. A profile correcting device comprising:
an acquiring unit that is configured to acquire a device profile indicating correspondence relationships between a plurality of input values and a plurality of sets of first output values, each first output value set corresponding to one of the plurality of input values, each input value representing an achromatic color having a density level, each first output value set including a plurality of chromatic values each representing a chromatic color, the achromatic color being reproduced by mixing the chromatic color;
a performing unit that is configured to perform a process for each input value, the performing unit including:
a control unit that is configured to control an image forming device to form a test patch based on one first output value set corresponding to the each input value;
a measuring unit that is configured to measure color of the test patch, the color being represented by a set of a*b* values, the a*b* value set including a first a* value and a first b* value which are defined in a CIEL*a*b* color space;
a determining unit that is configured to determine whether or not the one first output value set is a to-be-corrected first output value set, the to-be-corrected first output value set corresponding to a test patch whose color is represented by an a*b* value set including at least one of the first a* value greater than an a* prescribed value and the first b* value greater than a b* prescribed value, the a* prescribed value and the b* prescribed value being smaller than zero; and
a correcting unit that is configured to correct, if the determining unit determines that one first output value set is the to-be-corrected first output value set, the one first output value set to a second output value set which enables the image forming device to form color that is represented by an a*b* value set including a second a* value and a second b* value, the second a* value being smaller than or equal to the a* prescribed value, the second b* value being smaller than or equal to the b* prescribed value.

* * * * *